(12) United States Patent
Kobayashi et al.

(10) Patent No.: US 6,356,978 B1
(45) Date of Patent: Mar. 12, 2002

(54) FILE CONTROL DEVICE

(75) Inventors: Tohru Kobayashi; Mikio Ito; Shinichi Nishizono, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/328,842

(22) Filed: Jul. 8, 1999

(30) Foreign Application Priority Data

Sep. 11, 1998 (JP) ............................................. 10-258127

(51) Int. Cl.[7] .............................................. G06F 12/00
(52) U.S. Cl. ...................................................... 711/113
(58) Field of Search ................................ 711/133, 112, 711/114; 709/105, 100, 102; 714/702, 710, 7

(56) References Cited

U.S. PATENT DOCUMENTS 5,975,738 A * 11/1999 DeKoning ................... 700/79
6,006,342 A * 12/1999 Beardsley ..................... 714/5

* cited by examiner

Primary Examiner—Kevin L. Ellis
Assistant Examiner—C. P. Chace
(74) Attorney, Agent, or Firm—Greer, Burns & Crain, Ltd.

(57) ABSTRACT

A file control device is adapted to be connected between at least one host apparatus and a plurality of memory devices, and includes at least one channel adapter connected to the host apparatus for transferring data to and from the host apparatus and a plurality of device adapters connected to the memory devices for transferring data to and from the memory devices. A plurality of resource management modules is also included for controlling the channel adapter, the device adapter and the memory devices. A common memory stores management data for controlling the memory devices and a resource sharing program designates the management of the memory devices between the resource management modules. Also, an area determining program determines the areas in the common area in which to store the management data of the memory devices in accordance with the management designation of the resource sharing program.

13 Claims, 10 Drawing Sheets

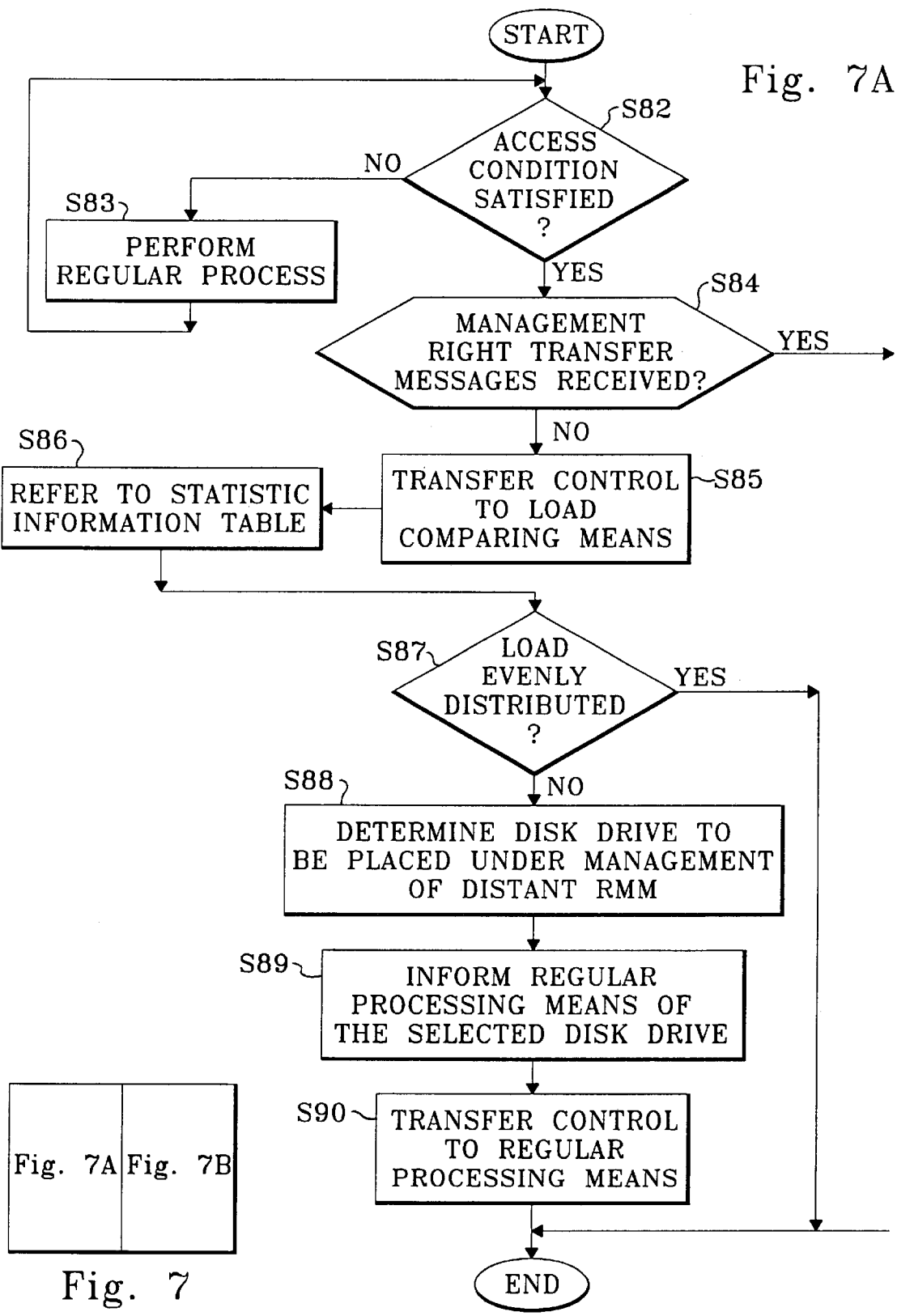

FILE CONTROL DEVICE

The present invention relates to file control devices for controlling external memory devices in information processing systems, and particularly to a file control device for controlling a plurality of disk type memory devices.

In a typical information processing system, a disk subsystem including a plurality of magnetic disk drives and a file or disk control device for controlling the disk drives is normally employed as an external memory system. The disk control device accesses a designated magnetic disk drive in accordance with an access request from a host apparatus. In response, the accessed disk control device transfers the requested data to the host apparatus via the disk control device. Thus, it is highly desirable to have a disk control device which efficiently controls the data transfer between the disk drives and the host apparatus, particularly in view of the rapid progress in the information processing field.

With respect to the structure of the known file or disk control devices, they are typically divided into a plurality of function modules. One such known structure is shown in FIG. 9, and generally indicated at 101. The disk control device 101 is connected between a plurality of host apparatus 102 (one shown) and a plurality of disk drives 103, and enables the host apparatus to access the disk drives. Any of the disk drives 103 can be used in common by the host apparatus 102 by using the disk control device 101.

The disk control device 101 is divided into an "a" group and a "b" group, for example. These groups are electrically isolated from each other, but include the same function modules which perform duplicate operations to protect the information processing system against failures. Thus, the description of the function modules generally applies equally to both groups and are made without specifying the particular group to which they belong.

Each of the host apparatus 102 is connected to a corresponding channel adapter (CA) 104 provided in the disk control device 101. The channel adapter 104 transfers data between the host apparatus 102 and a share storage (SS) 105 which stores the data transferred between the host apparatus 102 and the disk drives 103, in accordance with commands issued by the host apparatus. In other words, the share storage 105 is generally used as a cache memory for temporarily storing data to be stored in the disk drives 103 or to be retrieved from the disk drives.

Data is stored in the share storage 105 via the channel adapters 104 when the data is received from the host apparatus 102, or via device adapters (DA) 106 when received from the disk drives 103. The channel adapter 104 checks, when the host apparatus 102 requests a particular data, whether the object data exists in the cache memory, i.e., in the share storage 105. The data stored in the cache memory is managed by cache function engines (CFE) 107a, 107b, which are respectively connected to common buses 108a, 108b. The cache function engines 107a, 107b, from both group "a" and group "b" are connected in common to a cache table storage (CTS) 112 which maintains a list of data stored in the cache memory for both groups. By referring to the cache table storage 112, the cache function engine 107 judges whether the data inquired by the channel adapter 104 exists in the cache memory, and then notifies the result to the channel adapter 104. If the object data exists in the cache memory, i.e., in the share storage 105, the channel adapter 104 transfers the data to the host apparatus 102 from the cache memory.

On the other hand, if the object data does not exist in the share storage 105, the object data must first be stored in the share storage. Thus, upon receiving a response from the cache function engine 107 that the object data is not stored in the cache memory, the channel adapter 104 makes a request to a resource manager (RM) 109 to store the data in the cache memory. This request is also made through the bus 108. The resource managers 109a, 109b from both groups "a" and "b" are connected in common to a resource table storage (RTS) 113, which maintains the data regarding the disk drives 103 which are connected to and under the control of the control device 101, and the arrangement of data in those disk drives.

By referring to the resource table storage (RTS) 113, the resource manager 109 identifies the particular disk drive 103 in which the data requested by the channel adapter 104 is stored and the corresponding device adapter 106 which is connected to the identified disk drive. Thereafter, the resource manager 109 requests the device adapter 106 to store the object data to the cache memory or share storage 105. Upon receiving the request from the resource manager 109, the disk adapter 106 instructs the disk drive 103 which has the object data to transfer the data to the cache memory. The disk adapter 106 also inquires the cache function engine 107 for an area in the cache memory where the object data can be stored.

In response, the cache function engine 107 searches for a vacant area in the cache memory by referring to the cache table storage 112, and notifies the device adapter 106 of the available storage area. The device adapter 106 then transfers the data from the disk drive 103 to the area specified by the cache function engine 107. When the transfer of the object data is completed, the disk drive 103 notifies the disk adapter 106. Once the device adapter 106 stores all the object data in the cache memory, it then notifies the cache function engine 107 and the resource manager 109 of the completion of the data transfer. The cache function engine 107 then updates the cache table storage 112 to reflect the storage of the object data in the cache memory.

Meanwhile, the resource manager 109, which has received a message from the device adapter 106 that the object data has been transferred to the cache memory, notifies this event to the channel adapter 104, which then inquires the cache function engine 107 again whether the object data is stored in the cache memory. In response, the cache function engine 107 again refers to the cache table storage 112 and judges whether the data inquired by the channel adapter 104 is stored in the cache memory or not, and then sends a message to channel adapter 104. Here, since the object data has been stored in the cache memory by the device adapter 106, the cache function engine 107 notifies the channel adapter 104 that the object data is stored in the cache memory. Upon receiving this notification, the channel adapter 104 transfers the data to the host apparatus 102 from the cache memory, thereby completing the response to the data request from the host apparatus.

Each of the groups "a" and "b" is also provided with service adapters (SA) 110 for conducting maintenance of each function module in their respective groups. The service adapter 110 sends data informing about a structure of the disk control device 101 to each function module, and conducts boot process and diagnostic process for each module also. The service adapter 110 is provided with a discrete disk drive 111 for storing various kinds of data necessary for performing the maintenance functions.

As the information processing systems grow to accommodate a greater number of host apparatus and disk drives, occurrences of disk control device failures resulting in the stoppage of the entire system become a very important problem. The file control devices 101 of the type described above, which have a structure that can be divided into duplicate groups, are effective in preventing system stoppage which occurs as a result of file control device failures. In the file control device of FIG. 9, the channel adapter 104a, the device adapter 106a and the share storage 105a of function group "a" are all connected to the common bus 108a, but not to the common bus 108b, which is electrically isolated from the bus 108a. As such, the modules 104a–111a in group "a" are also electrically isolated from the modules 104b–111b in group "b." Therefore, if a destructive failure is generated in any of the modules in any one group, the failure is localized to that group only, so that the other group can still operate the file control device 101.

Since the advent of the above-described file or disk control devices, the average number of the channel adapters 104 and the device adapters 106 provided in the file control device have increased dramatically to accommodate a greater number of host apparatus and disk drives that are connected to the file control devices. Accordingly, the cache table storage 112 and the resource table storage 113 are accessed more frequently to update the management information between the host apparatus 101 and the disk drives 103. In the conventional disk drives, however, only one cache table storage 112 and one resource table storage 113 are provided for both groups "a" and "b." Consequently, there is often a bottle-neck at the cache table storage 112 and/or the resource table storage 113. Thus, there is a need for a file control device which is not susceptible to bottle-necks at the cache table storage 112 and/or the resource table storage 113.

Accordingly, one object of this invention is to provide a new and improved file control device.

Another object is to provide a new and improved file control device which do not cause bottle-necks during the access and the updating of management information tables.

Yet another object is to provide a new and improved file control device which has a management information table for each group, so that the bottle-necks can be eliminated.

SUMMARY OF THE INVENTION

In keeping with one aspect of this invention, a file control device adapted to be connected between at least one host apparatus and a plurality of memory devices includes at least one channel adapter connected to the host apparatus for transferring data to and from the host apparatus and a plurality of device adapters connected to the memory devices for transferring data to and from the memory devices. A plurality of resource management modules is also included for controlling the channel adapter, the device adapter and the memory devices. A common memory stores management data for controlling the memory devices and a resource sharing program designates the management of the memory devices between the resource management modules. Also, an area determining program determines the areas in the common area in which to store the management data of the memory devices in accordance with the management designation of the resource sharing program.

BRIEF DESCRIPTION OF THE DRAWINGS

The above-mentioned and other features of this invention and the manner of obtaining them will become more apparent, and will be best understood by reference to the following description, taken in conjunction with the accompanying drawings in which:

FIG. 7 shows arrangement of FIGS. 7A and 7B;

FIGS. 7A and 7B show a process flowchart of load comparing means;

DETAILED DESCRIPTION OF THE INVENTION

Figure 1:
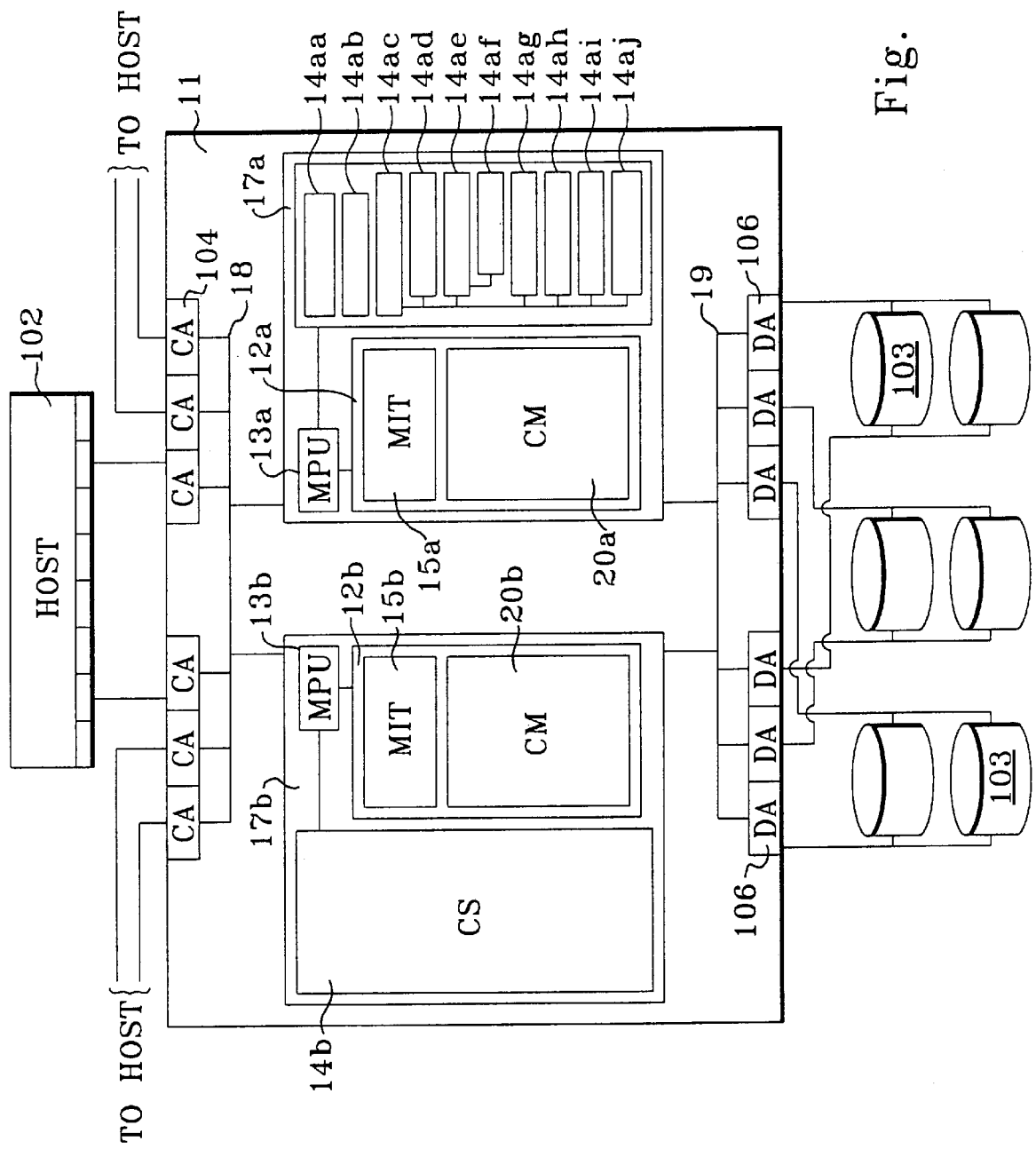
FIG. 1 is a structural diagram of a file control device of the present invention.
Figure 9:
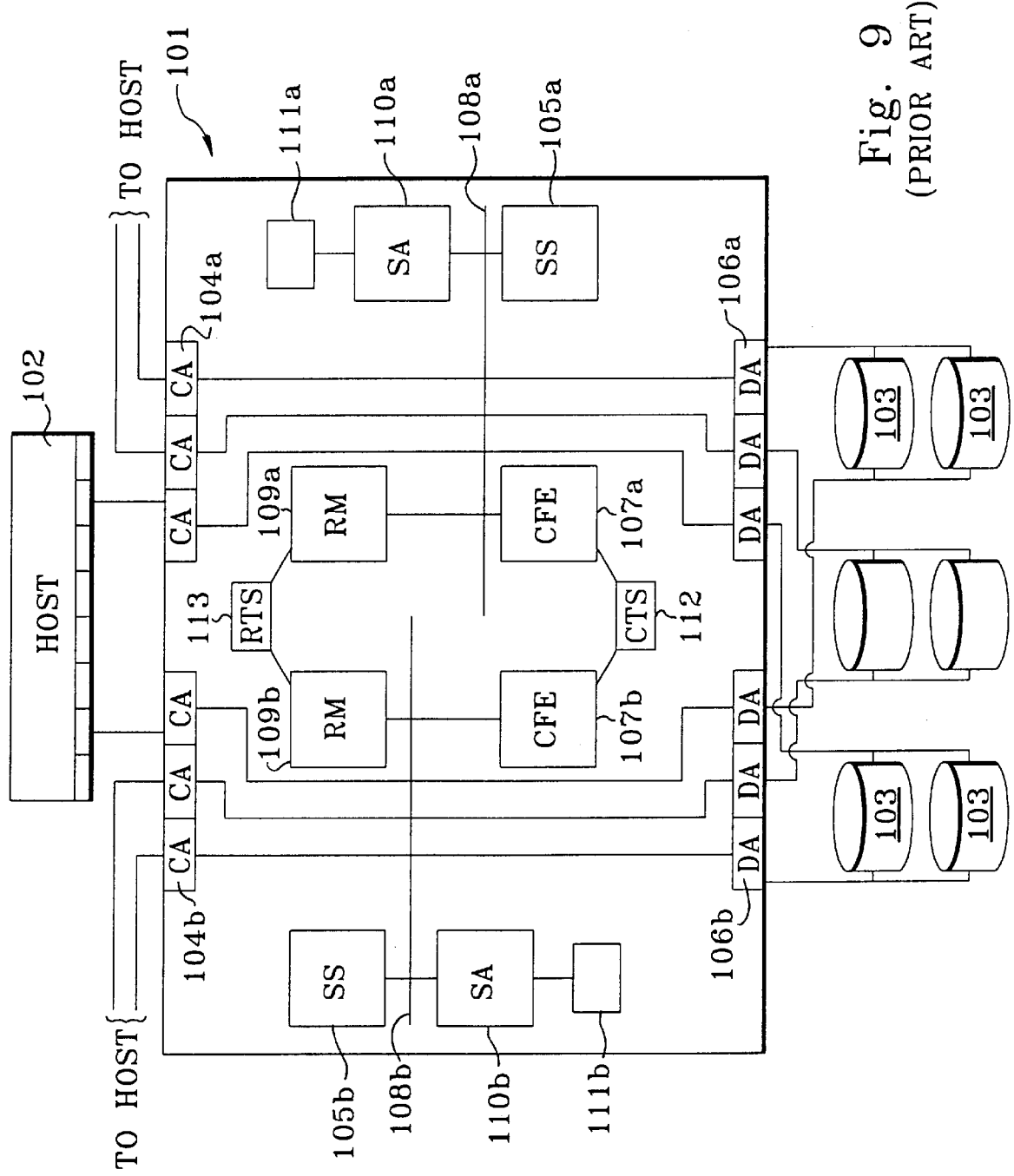
FIG. 9 is a structural diagram of a prior art file control device.

Referring now to FIG. 1, a disk control device of the present invention is generally designated at 11, and is connected to a plurality of host apparatus 102 (one shown) and to a plurality of disk drives 103. It should be noted that the features of the present invention that are similar to those of the prior art disk control device 101 of FIG. 9 are designated with the same reference numerals in the figures described below.

The disk control device 11 includes a pair of resource management modules (RMM) 17a, 17b, which are connected to channel adapters 104 via an upper bus 18 and to device adapters 106 via a lower bus 19. By comparison, the resource management modules 17a, 17b may be thought of as modules respectively integrating the resource managers 109a, 109b, the cache function engines 107a, 107b, the shared storages 105a, 105b and the service adapters 110a, 110b described above with respect to the known disk control device 101 of FIG. 9.

The resource management modules 17a, 17b respectively include management information tables (MIT) 15a, 15b and cache memories (CM) 20a, 20b provided in common memories (COM MEM) 12a, 12b. In operation, each of the resource management modules 17a, 17b updates the management information stored in its own common memory 12 when the internal condition of the disk control device 11 changes, and simultaneously also updates the management information of the common memory provided in the other resource management module. In this manner, the common memory 12 in each of the resource management modules 17a, 17b have the same contents. Preferably, a dedicated bus (not shown) connects the two common memories 12a, 12b for purposes of updating the management information. However, the common memories 12a, 12b can also be updated by using either the upper bus 18 or the lower bus 19.

The resource management modules 17a, 17b also respectively include microprocessors (MPU) 13a, 13b and control storages (CS) 14a, 14b. The MPUs 13a, 13b are respectively connected to the common memories 12a, 12b and to the control storages 14a, 14b for enabling exchange of data between the common memories and the control storages. The MPUs 13a, 13b control the operations of their corresponding resource management modules 17a, 17b, in accordance with the micro-programs stored in the control storages 14a, 14b. The control storages 14a, 14b respectively include resource sharing means 14aa, 14ba; area determining means 14ab, 14bb; regular processing means 14ac, 14bc; fault detecting means 14ad, 14bd; area changing means 14ae, 14be; load monitoring means 14af, 14bf; load comparing means 14*ag*, 14*bg*; load restructuring means 14*ah*, 14*bh*; copying means 14*ai*, 14*bi*; and cache memory acquiring means 14*aj*, 14*bj*. These micro-programs perform the same functions in their respective resource management modules 17*a*, 17*b*, and therefore, they will be referenced generally without indicating the management module to which they belong.

Figure 2:
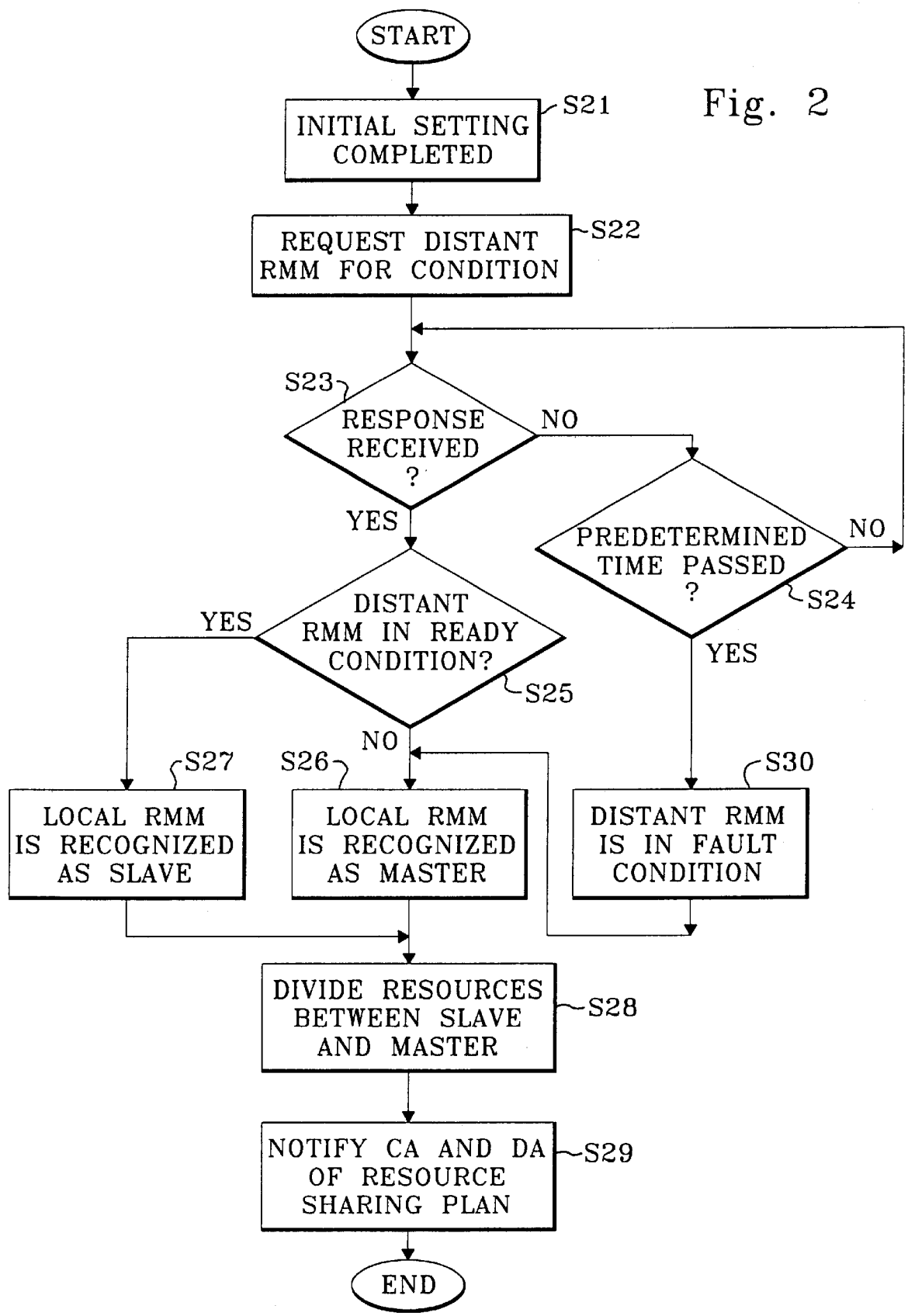
FIG. 2 is a flowchart of the operation of resource sharing means.

Turning now to FIG. 2, a resource management sharing process is started after a power is turned ON and the initial setting process e.g., initial diagnostic process, memory space allocation, etc., of the resource management modules 17*a*, 17*b* is completed (step S21). The resource sharing means 14*aa* or 14*ba* in the "local" resource management module 17 inquires the "distant" the resource management module 17 whether it is in the ready condition or not (step S22). For example, if the resource sharing means is in the resource management module 17*a*, i.e., if the resource sharing means is 14*aa*, the module 17*a*, would be the a "local" resource management module, and module 17*b* would be the "distant" resource management module. The opposite would be true if the resource sharing means is in the module 17*b*, i.e., if the resource sharing means is 14*ba*, then the resource management module 17*b* would be the "local" and module 17*a* would be the "distant" management module. The local resource sharing means 14*aa* or 14*ba* then waits for a response from the distant resource management module 17 (step S23).

If a response is not returned from the distant resource management module 17 within a predetermined period (step S24), it is determined that an error has occurred and that the distant resource management module 17 is in a fault condition (step S30). The resource sharing means 14*aa* or 14*ba*, as a result, recognizes itself as being in a "master" resource management module (step S26), i.e., the local resource management module, whether 17*a* or 17*b*, is considered to be the "master".

On the other hand, if a response is received from the distant resource management 17 within the predetermined time, it is determined whether the distant resource management module is in a ready condition (step S25). If it is in the ready condition, the local resource sharing means 14*aa* or 14*ba* recognizes itself as being in a "slave" resource management module (step S27). If, however, the distant resource management module is not in the ready condition, it is recognized that the local resource sharing means 14*aa* or 14*ba* is in the master resource management module (step S26).

Once the master/slave status of the local and the distant resource management modules 17*a*, 17*b* has been established, the control of the resources, i.e., the disk drives 103, are divided between the master and the slave (step S28). For example, the master resource management module 17*a* or 17*b* would manage the even numbered disk drives 103 and the slave resource management module 17*b* or 17*a* would manage the odd numbered disk drives. It should be noted, however, that if the master status of the local resource management module 17*a* or 17*b* is established as a result of the distant resource management module 17*b* or 17*a* being in a fault condition as described above in (step 30), the master would manage all the disk drives 103.

Finally, the resource sharing means 14*aa*, 14*ba* notify of the results of the resource sharing arrangement to all the channel adapters 104 and the device adapters 106 (step S29), so that they know to which resource management modules 17*a*, 17*b* the object data should be routed. The resource sharing process is ended at this point.

Upon the determination of the resource sharing arrangement between the master and the slave resource management modules, the area determining means 14*ab*, 14*bb* determine the location within their corresponding management information table 15*a*, 15*b* to which to store the management data regarding the sharing arrangement of the resources. Each of the management information tables 15*a*, 15*b* is divided into two halves. Therefore, the management data regarding the resources assigned to the master resource management module can be arranged in the former half of its corresponding management information tables 15*a* or 15*b*, and the management data regarding the resources assigned to the slave resource management module in the latter half of the management information table. In this manner, the area determining means 14*ab*, 14*bb* uniquely determine the location of the management data in the management information tables 15*a*, 15*b* from the results of the resource sharing means 14*aa*, 14*ba*.

After recognizing the resources under its management as determined by the resource sharing means 14*aa* or 14*ba*, and knowing the location of the management information stored in the management information tables 15*a*, 15*b*, the MPUs 13*a*, 13*b* start their regular operation in which the MPUs wait for an access from a host apparatus, respond to the access when it is requested and execute the requested process.

It should be noted that in the preferred embodiment, the resource management modules 17*a*, 17*b* are provided with the common memories 12*a*, 12*b* for storing the management information tables 15*a*, 15*b*, respectively. The management information table is duplicated to improve reliability. It should be noted, however, that the object of the present invention can be attained, depending on the weight of performance and reliability required, even when the disk control device 11 is provided with only one management information table 15 and access is made to this memory from both of the resource management modules.

The structure of the common memories 12*a*, 12*b* provided in the resource management modules 17*a*, 17*b* are identical and the structure of the address spaces within the common memories are also identical. Namely, the address in which the management data regarding a certain resource is stored, is the same in both of the common memories 12*a*, 12*b* provided in the master and the slave resource management modules 17*a*, 17*b*. Employing this stricture, a copy of the management information table 15 in one common memory 12*b* or 12*a* can easily be provided in the other common memories 12*a* or 12*b*, thereby resulting in full duplication of information.

Figure 3:
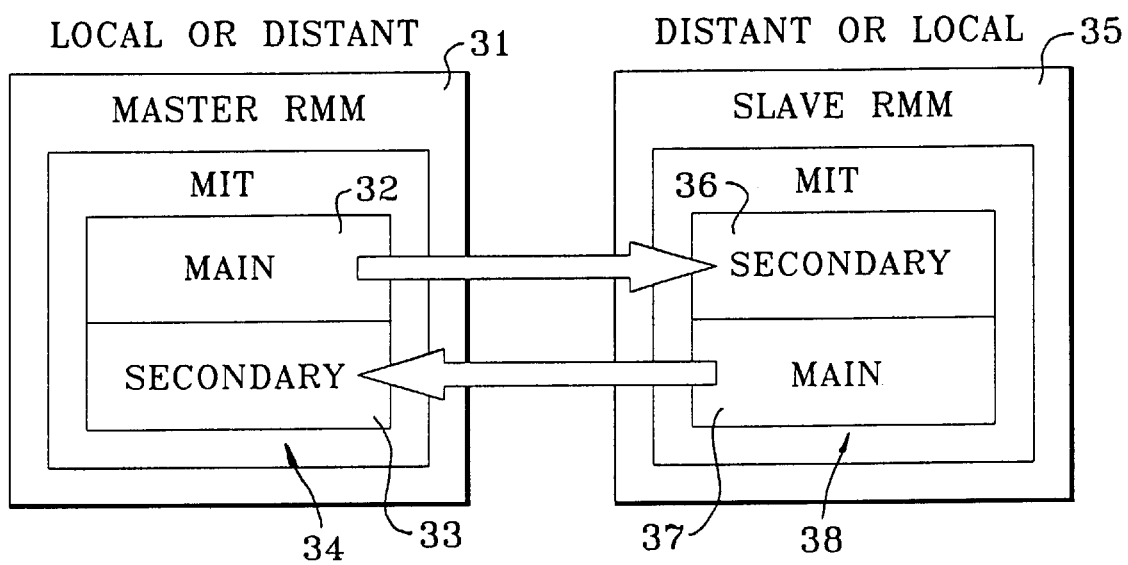
FIG. 3 is a diagram illustrating the duplication process of a resource information table.

Referring now to FIG. 3, the master resource management module 31, one of the resource management modules 17*a*, 17*b*, includes a main area 32 and a secondary area 33 provided in the master management information table 34. In operation, the master resource management module 31 manages the management data stored in the main area 32 of the master management information table 34. The slave resource management module 35, the other one of the resource management modules 17*a*, 17*b*, includes a secondary area 36 and a main area 37 in the slave management information table 38. The slave resource management module 35 manages the management information stored in the main area 37.

It should be noted that the secondary area 36 of the slave resource management module 35 stores the same data that is stored in the main area 32 of the master resource management module 31, and the secondary area 33 of the master resource management module 31 stores the same data stored in the main area 37 of the slave resource management module 35. As such, any one of the resource management modules 31, 35 can always update the data in their respective main areas 32, 37 without considering the data updating operation of the other resource management modules 35, 31 in its main area. As a result, a competition for access to the management information tables 34, 38 is avoided.

The data stored in the secondary area 33 of the master resource management module 31 is copied from the main area 37 of the slave resource management module 35 by the copying means 14i of the slave resource management module 35, and the data stored in the secondary area 36 of the slave resource management modules 35 is copied from the main area 32 of the master resource management module 31 by the copying means 14i of the master resource management module 31.

Figure 4:
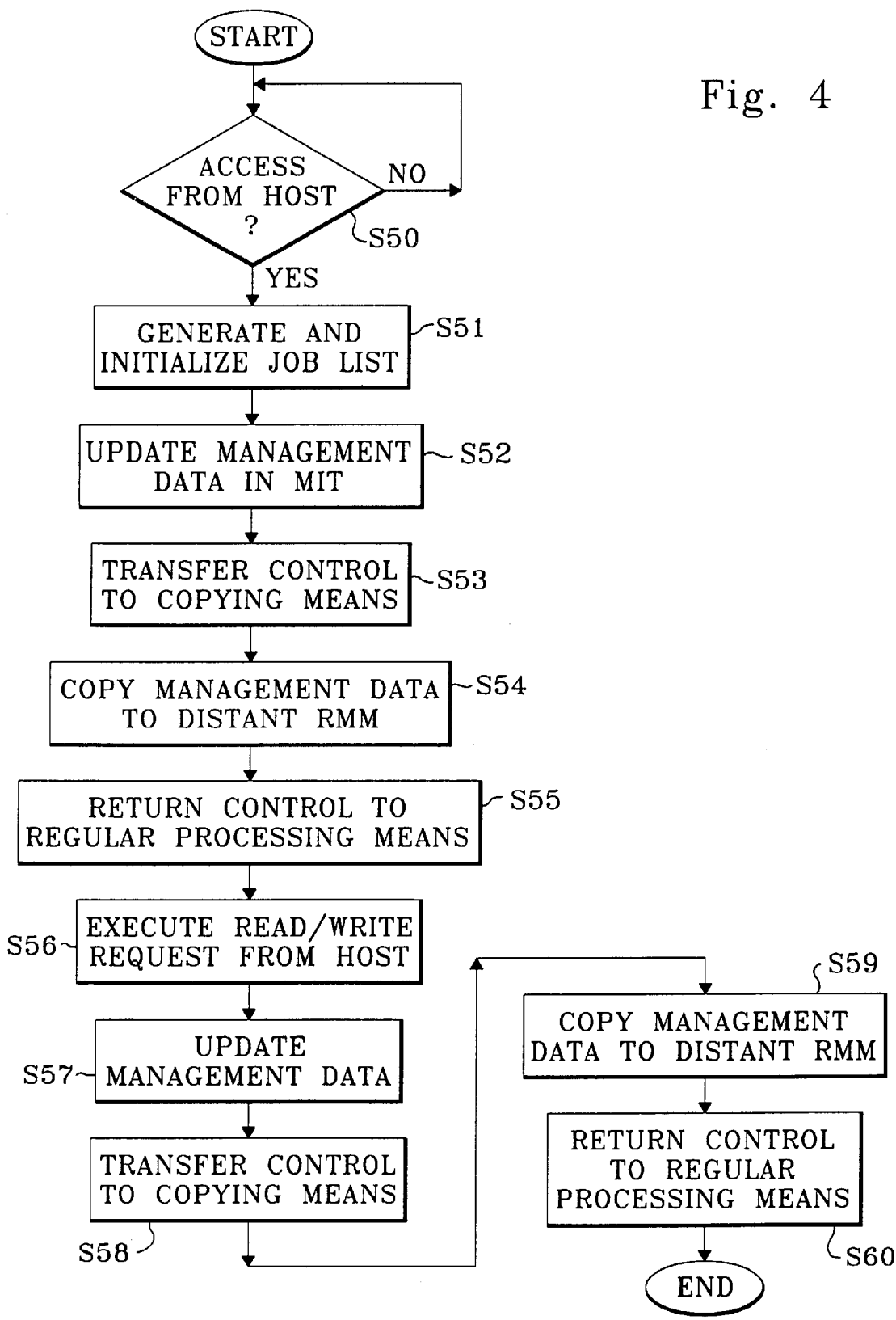
FIG. 4 is a flowchart of the operation of copying means.

The copying process is explained with reference to FIG. 4. At the start of the copying process, the resource management module 17 initiates the regular processing means 14c, which waits for instructions for accessing the resources or disk drives 103 from the host apparatus 102 via the channel adapters 104 (step S50). Upon receipt of such instructions, the regular processing means 14c generates a job list regarding the relevant access, and then initializes the job list by recording various pieces of control information on the job list (step S51). Then, the regular processing means 14c updates the management data provided in the management information table 15 based on the access request from the host apparatus 102 (step S52).

After the management data is updated, the regular processing means 14c transfers control to the copying means 14i (step S53) to synchronize the management information tables 15a, 15b. The copying means 14i copies the updated management data to the management information table 15a or 15b of the distant resource management module 17 (step 54), and then returns the process to the regular processing means 14c (step 55). The regular processing means 14c then executes the read/write process requested by the host apparatus 102 (step S56), and again updates the management data after the read/write process is completed (step S57).

After the management data is updated, the regular processing means 14c again transfers control to the copying means 14i (step S58), because it is required to further synchronize the management information tables 15a, 15b. The copying means 14i copies the updated management data to the management information table 15 of the distant resource management modules 17 (step S59) and then returns the process to the regular processing means 14c (step60), and the processes is completed.

Figure 5:
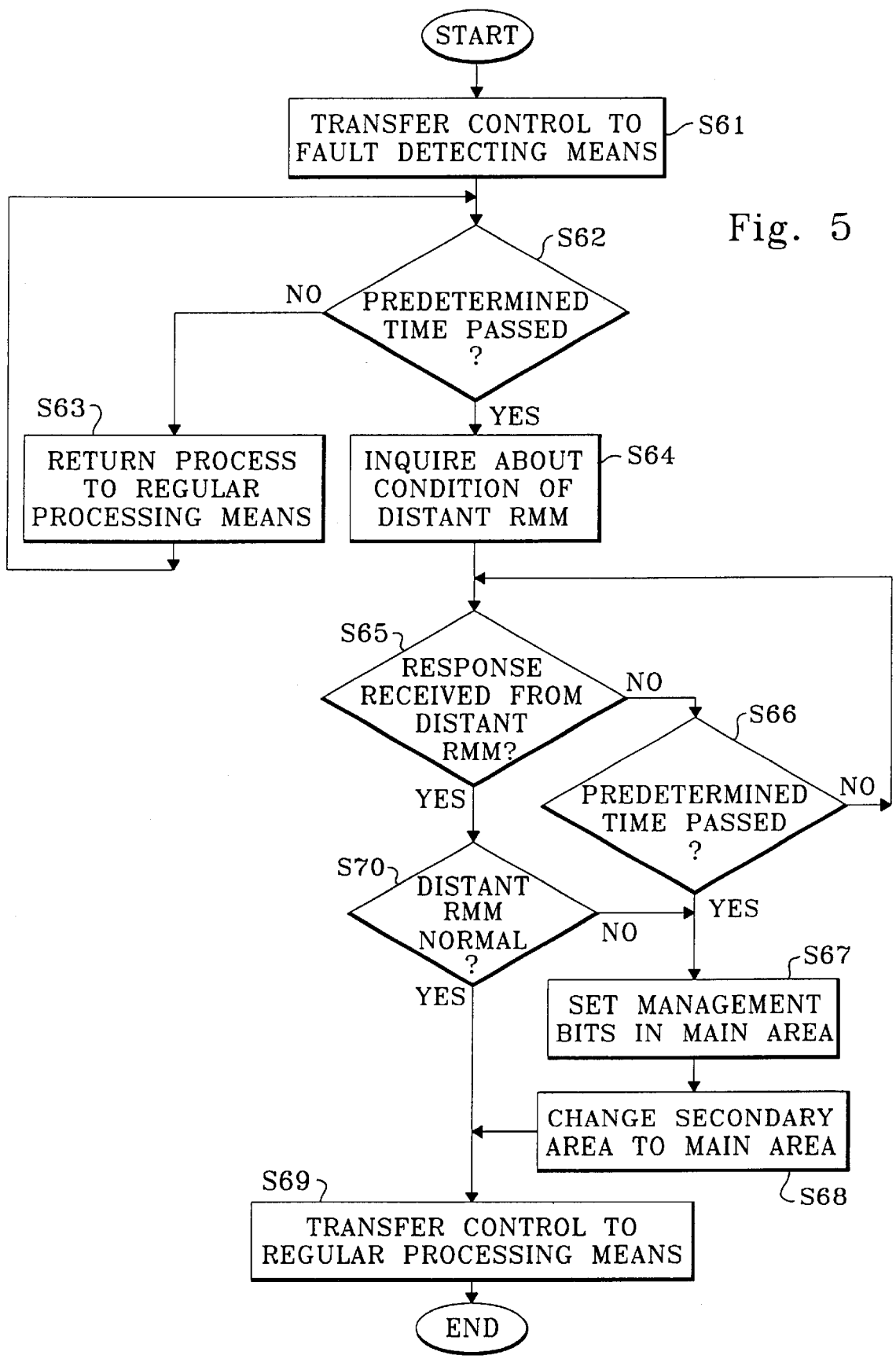
FIG. 5 is a process flowchart of fault detecting means.

Turning now to FIG. 5, the operation of the fault detecting means 14d (best seen in FIG. 1) for detecting faults in the distant resource management module 17 is described. At the start of this process, the regular processing means 14c transfers control to the fault detecting means 14d (step S61), which waits for a passage of a predetermined time (step S62). If the predetermined time has not passed, the fault detecting means 14d returns the process to the regular processing means 14c (step S63).

After the predetermined time has passed, the fault detecting means 14d in the local resource management module 17 inquires about the condition of the distant resource management module 17 (step S64), and waits for a response from the distant resource management module (step S65). If a response is not returned, the fault detecting means 14d waits for another predetermined time (step S66). If, after this predetermined time, a response is still not received, it is determined that the distant resource management module 17 is in a fault condition, and the fault detecting means 14d sets management data in the main area 32 or 37 (best shown in FIG. 3), whichever happens to be the local resource management module 17, to indicate that the secondary area 33 or 36, as well as the main area 32 or 37, of the distant resource management module 17 are to be managed by the local resource management module (step S67).

The management data includes two bits which are located within the main area 32, 37 of each of the local and distant resource management modules 17. The two bits correspond to the main and secondary areas and are set to ON or OFF state to indicate to the resource management module 17 the management allocation of its main and secondary areas. For example, if the management bits are set to "1" and "0" in the local resource management module 17, its main area 32 or 37 would be managed by the local resource management module and its secondary area 33 or 36 would be managed by the distant resource management module 17. If, however, the management bits in the local resource management module 17 are set to "1" and "1," for example, then the local resource management module would manage both the main area 32 or 37 and the secondary area 33 or 36.

Once both of the management bits of the local resource management module 17 have been set to indicate that the secondary area 33 or 36 should be managed by the local resource management module 17, the area changing means 14e changes the secondary area 33 or 36 into the main area 32 or 37, respectively (step S68). In this manner, both the original main area and the newly designated main area are managed by the same local resource management module 17. Then, control of the process is transferred to the regular processing means 14c (step S69) and the fault detecting process is ended.

On the other hand, if a response is received from the distant resource management module 17 at (step S65), the fault detecting means 14d checks the response to determine whether the distant resource management module 17 is normal (step S70). If it is, the process is transferred to the regular processing means 14c (step S69) and the fault detecting process is ended.

In accordance with one aspect, the present invention monitors and then compares the load placed upon each of the resource management modules 17a, 17b and then equalizes the load on the resource management modules. When the resources shared by the two resource management modules 17a, 17b are divided, the load may be unevenly distributed between the two modules, depending on the running environment or the nature of the information processing system. Consequently, there may be situations where the disk control device 11 is placed on standby waiting for one resource management module 17a or 17b to complete its processes, while the other resource management module 17b or 17a stands idle. This condition is undesirable because it negatively affects the performance of the disk control device 11.

To monitor the load balance of the resource management modules 17a, 17b, the load monitoring means 14f (best seen in FIG. 1) is provided in the resource management modules. Generally, the load balance can be determined by obtaining statistical information such as the number of times of access per unit time, the total number of times of access and the average response time, for example. It should be understood, however, that the other statistical information may be used depending on the type of the information processing system.

In the present invention, the load monitoring means 14f is provided with a statistic information table (not shown)

within the common memory 12, so that the table can be updated to reflect each generation of access to each resource and each end of access. The statistic information table has a preferred format which keeps track of the total access time and the number of times of access counted for each disk drive. This format can easily be established in various modes within the common memory 12 using known techniques. Thus, a detailed explanation regarding this format is omitted.

Figure 6:
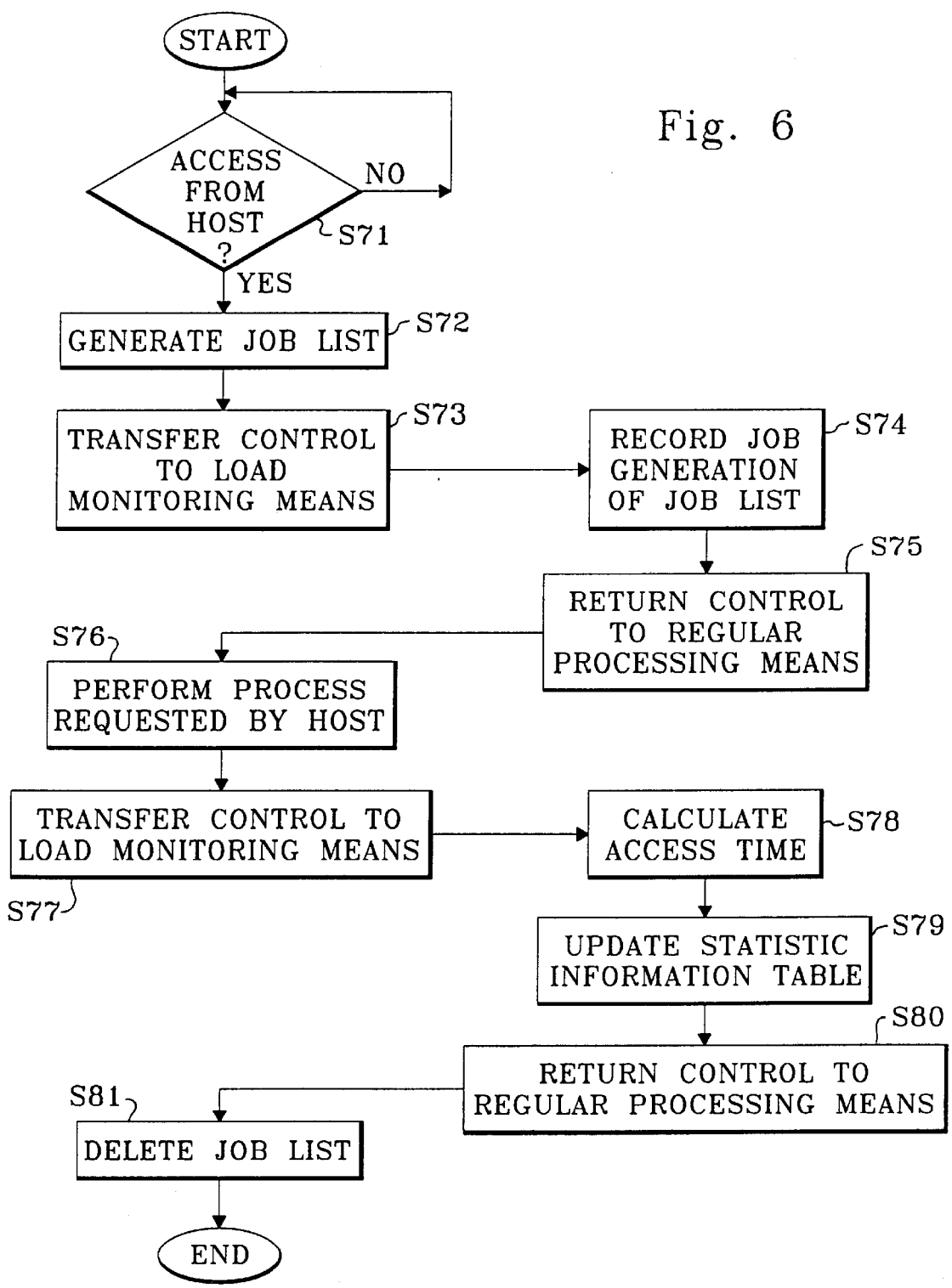
FIG. 6 is a process flowchart of load monitoring means.

Referring now to FIG. 6, the regular processing means 14c(best seen in FIG. 1) waits for an access from the host apparatus 102 at the start of the load monitoring process (step S71). It should be understood that the MPU 13 (best shown in FIG. 1) operates in accordance with the microprograms stored in the control storage 14, such as the regular processing means 14c. The regular processing means 14c generates a job list when the channel adapter 104 inquires whether the object data exists in the cache memory 20 (step S72). Preferably, one job list exists for one access, and the device number of the disk drive 103 is recorded on the job list as the object of the access.

The regular processing means 14c transfers control to the load monitoring means 14f when the generation of the job list is completed (step S73). The load monitoring means 14f records the job generation time on the job list which has been generated by the regular processing means 14c (step S74), and returns control to the regular processing means 14c (step S75). The regular processing means 14c allows the access process requested by the host apparatus 102 to be performed (step S76), and then transfers control to the load monitoring means 14f again when the access process is completed (step S77).

The load monitoring means 14f determines that the access process has been completed by making reference to the job list, and then compares the job generation time previously recorded on this job list and the current time to calculate the length of the access time (step S78). The results of the calculation is added to the total access time for the accessed disk drive 103 stored in the statistic information table in the common memory 12, along with the value representing the number of times that disk has been accessed after being incremented by one (step S79). After updating the statistic information table, the load monitoring means 14f returns control to the regular processing means 14c, deletes the job list and updates, if required, the management information table 15 (step S81) to reflect the completed access process.

Figure 7B:
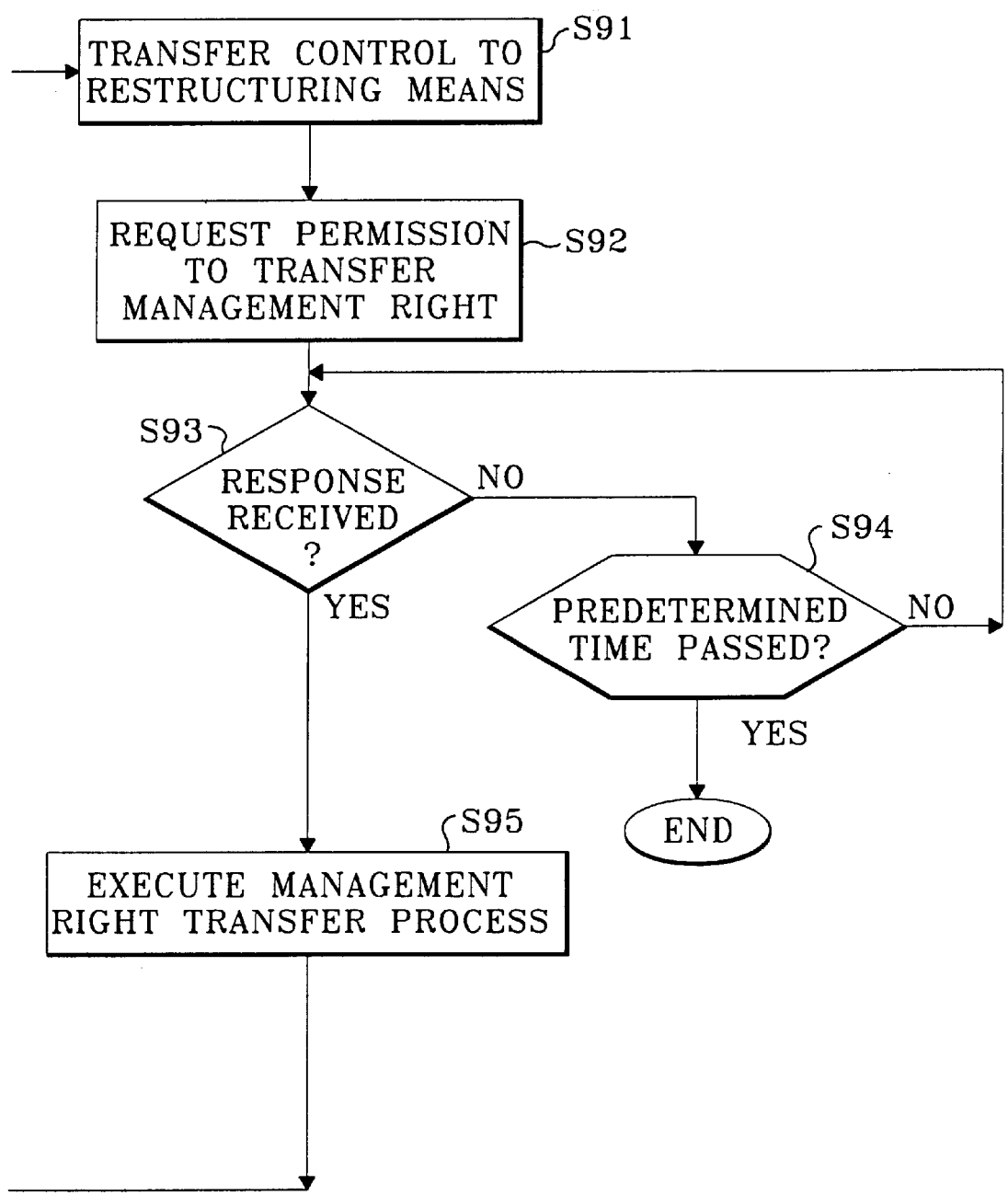

Referring now to FIG. 7, the operations of the load comparing means 14g and the load restructuring means 14h are explained. At the start, the regular processing means 14c waits for the completion of accesses of a constant period or accesses of a constant number of times to the disk drives 103 (step S82). When the access condition is not satisfied, the regular processing means 14c continues performing the regular access functions as requested by the host apparatus 102 (step S83). However, the regular processing means 14c determines, when the specified conditions are satisfied, whether a message suggesting transfer of management right is received (step S84) (see steps S87–S90 below).

If such a message is not received, the regular processing means 14c transfers control to the load comparing means 14g (step S85), which refers to the information regarding each disk drive 103 recorded in the statistic information table (not shown) in common memory 12 (step S86). From the statistic information table, the load comparing means 14g determines which disk drive 103 is placed under the control of which resource management modules 17. Thus, whether or not load is unevenly distributed between the two resource management modules 17a, 17b can be determined by referring to the statistic information table. If it is determined that the load is distributed evenly (step S87), the load comparing process is ended.

If it is determined, however, that the load is unevenly distributed, the load comparing means 14g determines which disk drive(s) 103 should be placed under the management of the distant or partner resource management module 17 (step S88). The selected disk drive(s) 103 may be, for example, the disk drive having the highest number of accesses or the disk drive having the longest total access time. It should be understood that the criteria used in selecting the disk drives can be changed depending on the type of information that is recorded as the statistic information.

Upon determination of the disk drive 103 which management right is to be transferred, the load comparing means 14g sends this message to the regular processing means 14c (step S89). This message can be realized, for example, by marking the relevant information at a particular area in the common memory 12. Since the information in the common memory 12 is provided in common for all the microprograms in control storage, the regular processing means 14c can detect the message from the load comparing means 14g. The load comparing means returns the process to the regular processing means 14c (step S90).

On the other hand, if a message is received from the load comparing means 14g at (step S84) that a disk drive should be placed under a management of a distant or partner resource management module 17, the regular processing means 14c transfers control to the restructuring means 14h (step S91). Since the resource management module 17 originally having the management right of the selected disk drive 103 is known, the restructuring means 14h recognizes that the distant or partner resource management module 17 should now have the management right of the selected disk drive.

The restructuring means 14h sends a message to the partner resource management module to request permission to have the management right transferred (step S92), and waits for a response from the partner resource management module 17 (step S93). If no response is received from the partner resource management module 17 even after a predetermined period has passed (step S94), an irregular end is generated and an error recovery process is subsequently executed. Although a detail explanation of the error recovery process is omitted here, it should be understood that the error recovery process is generally similar to the process which is performed when the fault detecting means detects a fault in the distant or partner resource management module 17.

If a response is received from the partner resource management module 17 giving permission to transfer the management right, the restructuring means 14h executes the management right transfer process for the disk drive 103 determined by the load comparing means 14g (step S95), which ends the restructuring procedure.

Figure 8:
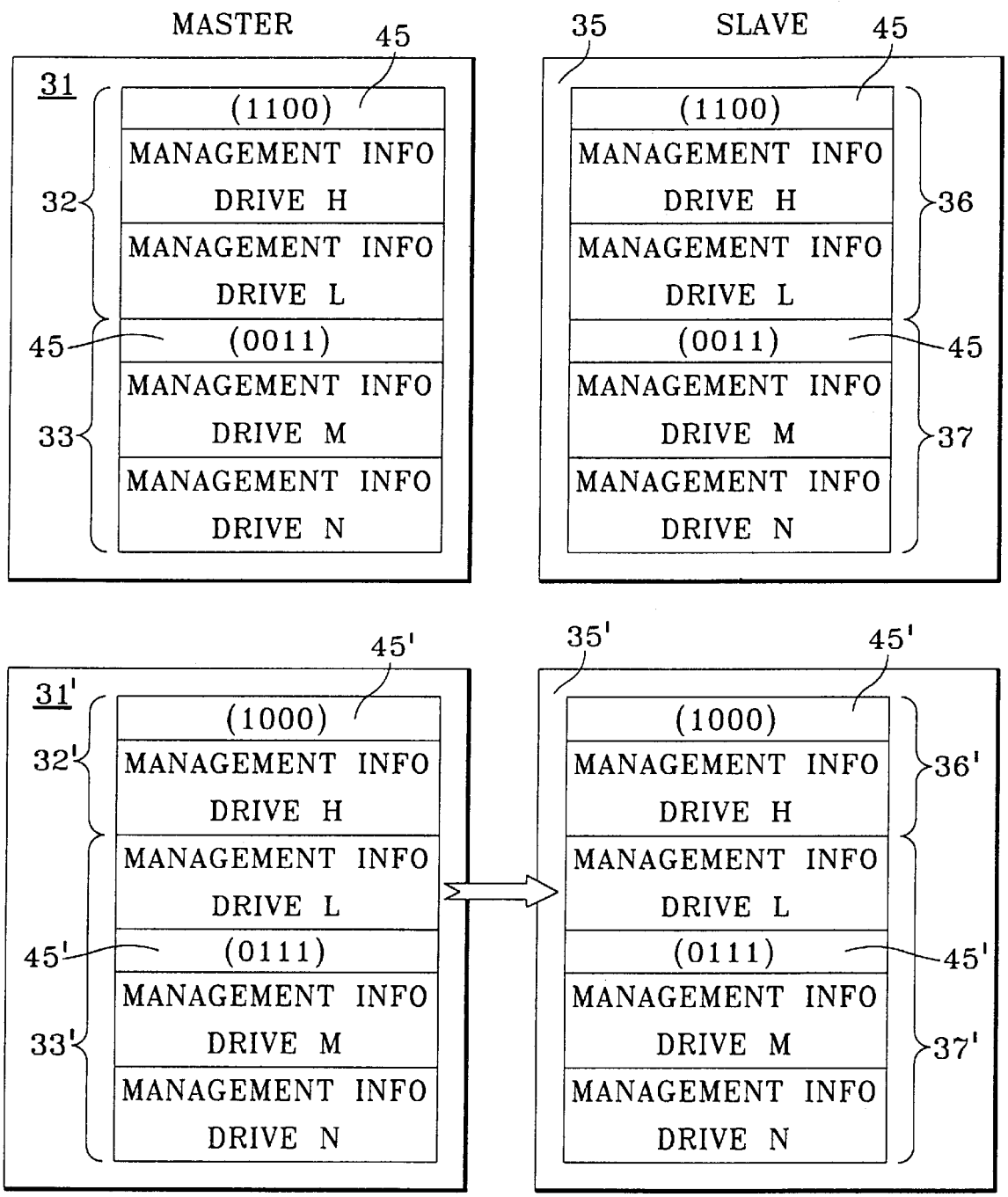
FIG. 8 is a diagram illustrating the process performed by area changing means.

A detailed description of the process for transferring the management right is shown in FIG. 8. Before the management right transfer process, the management information for the disk drives 103, for example, disk drives H and L, is stored in the main area 32 of the master resource management module 31. The duplicate management information for the disk drives H and L are stored in the secondary area 36 of the slave resource management module 35. Similarly, the management information for disk drives M and N, for example, is stored in the main area 37 of the slave resource management module 35, and the duplicate management information for drives M and N are stored in the secondary area 33 of the master resource management module 31. In this example, the management information of each disk is assumed to have equal capacity, and accordingly, the management data is shown as being arranged at constant intervals within the main and the secondary areas.

The master and the slave resource management modules 31, 35 are provided with a set of control bits in a control area 45, each of which bits corresponds to the management data stored in their respective resource management modules 31, 35. The bits which correspond to the information data provided in the main areas 32, 37 are designated with "1" while those that correspond to the information data in the secondary areas 33, 36 are designated with "0." Each of the resource management modules 31, 35 are recognized to have the management rights over the management data in which the control bit is set to "1," i.e., data which are in their respective main areas 32, 37 of the resource management modules.

In FIG. 8, the four control bits which correspond to the information data of the four disk drives H, L, M, N are located in the control area 45. For example, the control bits "1100" in the control area 45 of the main area 32 of the master resource management module 31 correspond to the information data of disk drives H, L, M, N, respectively, and indicate that disk drives H and L are under the management of the master resource management module. Similarly, the control bits "0011" in the control area 45 of the main area 37 of the slave resource management module 35 also correspond to the information data of disk drives H, L, M, N, respectively, but indicate that disk drives M and N are under the management of the slave resource management module.

When the restructuring means 14h executes the management right transfer process, the allocation of areas in the master and the slave resource management modules 31, 35 change from main to secondary or from secondary to main. For example, when the management right transfer is performed for disk drive L, the restructuring means 14h of the master resource management modules 31 resets the second control bit corresponding to the disk drive L in the main area 32 to "0." As a result, the control bits for the main area 32 in the control area 45 of the master resource management module 31 becomes "1000," as shown in the control area 45' of the master resource management module 31'. Meanwhile, the restructuring means 14h of slave resource management modules 35 sets the second control bit in the control area 45 in the secondary area 36 in the slave resource management module 35 corresponding to the disk drive L to "1." As a result, the control bit of the slave resource management module 35 becomes "0111," as shown in the control area 45' of the slave resource management module 35'. The management data of disk drive L in the master resource management module 31 now shifts to the secondary area 33' from the main area 32, and the management data of disk drive L in the slave resource management module 35 shifts to the main area 37' from the secondary area 36.

It should be understood that the above explanation of the present invention is based on the assumption that the capacity of the common memories 12a, 12b provided in each of the resource management modules 17a, 17b is identical. If the capacity is different, when the resource management modules 17a, 17b determine themselves as the master or slave, they send each other their own area of common memory to use a smaller capacity. As such, the common memory 12 having the higher capacity allows for an existence of unused area therein, but since it is most preferential to improve the control efficiency, it is desirable to use the identical structure for all common memories.

In accordance with another aspect of the present invention, the resource management module 17 also includes cache memory acquiring means 14j for controlling the data in the cache memory 20. It should be understood that the cache memory 20 is a portion of common memory 12 which stores data to be sent to and received from the memory devices 103. Thus, the cache memory acquiring means 14j controls the cache memory 20 in a manner similar to the method described above with respect to the control of the management information table 15, which is also a portion of the common memory 12. As such, the cache memory acquiring means 14j determines and designates the areas in the cache memory 20 which are to be managed by each of the cache memory acquiring means 14aj, 14bj, similar to the resource sharing means 14aa, 14ba for designating management of the memory device 103 between the resource management modules. The cache memory acquiring means 14j also performs the other functions associated with duplicating data in the cache memory 20 of both resource management modules 17a, 17b. In other words, the cache memory acquiring means 14j performs functions similar to those of the resource sharing means 14a, the area determining means 14b, the fault detecting means 14d, the area changing means 14e, the load monitoring means 14f, the load comparing means 14g, the load restructuring means 14h, and the copying means 14i.

In another embodiment of the invention, instead of the cache memory acquiring means 14j, control of the cache memory 20 is assigned to the above-described means 14a, 14b, 14d, 14e, 14f, 14g, 14h and 14i for controlling the management information table 15. The processes involved in controlling the cache memory 20 is similar to those required in controlling the management information table 15, since both the management information table and the cache memory are part of the common memory 12.

In the present invention, the memory device is defined as a disk drive but it is not intended to limit the memory device to those which can be divided into physical devices. The present invention can also be used in connection with a file control device for controlling logical drives represented by disk array apparatus.

The present invention is adapted to remarkably improve the efficiency of file control devices. Namely, a plurality of disk drives can be used in common by many host apparatus to cover the increase in the scale of the information processing system without delay causing bottle-necks. Moreover, the present invention is also effective for use with a system which requires using the same information by a plurality of hosts, and since the management information is duplicated, reliability of the file control device can be maintained.

While the principles of the invention have been described above in connection with specific apparatus and applications, it is to be understood that this description is made only by way of example and not as a limitation on the scope of the invention.

What is claimed is:

1. A file control device adapted to be connected between at least one host apparatus and a plurality of memory devices, comprising:

at least one channel adapter connected to the host apparatus for transferring data to and from the host apparatus;

a plurality of device adapters connected to the memory devices for transferring data to and from the memory devices;

at least two resource management modules for controlling said channel adapter, said device adapter and the memory devices;

a common memory for storing management data of the memory devices; and resource sharing means for designating management of the memory devices between said resource management modules; and area determining means for determining areas in said common memory in which to store said management data of said memory devices in accordance with the management designation of said resource sharing means.

2. The file control device as defined in claim 1 wherein said common memory, said resource sharing means and said area determining means are provided in each said resource management module, and said area determining means determines a first area in its corresponding common memory in which to store said management data for controlling the memory devices controlled by its corresponding resource management module, and a second area in its corresponding common memory in which to store said management data for controlling the memory devices controlled by the other said resource management module.

3. The file control device as defined in claim 2 wherein each of said resource management modules further includes copying means for copying said management data stored in said first area of said corresponding resource management module to the second area in said common area of the other said resource management module.

4. The file control device as defined in claim 2 wherein each of said resource management modules further includes fault detecting means for detecting a fault in the other of said resource management modules, and area changing means for changing said second area into said first area in one of said resource management modules in which a fault is not detected when said fault detecting means in said one of said resource management module detects said fault in said other of said resource management modules.

5. The file control device as defined in claim 2 wherein each of said resource management modules further includes load monitoring means for monitoring loads on corresponding said resource management modules, load comparing means for comparing said loads between said resource management modules based on monitoring results of said load monitoring means and for determining said management data of a selected memory device in one of said at least two resource management modules to be transferred to the other of said at least two resource management modules in accordance with a predetermined management transfer rule, when said loads on said resource management modules are distributed unevenly, and restructuring means for changing said first area of said resource management module in which said transferred management data of said selected device had been stored, into said second area, and for changing said second area of said resource management module receiving said transferred management data into said first area.

6. A file control device as claimed in claim 1, further comprising a cache memory defined in said common memory of each of said at least two resource management modules for storing the data recorded in the memory devices and data to be stored in the memory devices, wherein said resource sharing means determines a cache memory area within each cache memory to be managed by each of said at least two resource management modules, and said area determining means discriminates, on the basis of determination by said resource sharing means, a first cache memory area for registering data recorded in the memory devices controlled by one of said at least two resource management modules and a second cache memory area for registering data recorded in the memory devices controlled by the other of said at least two resource management modules, in said cache memory of each said resource management modules.

7. A file control device as defined in claim 6 wherein said resource management modules include copying means for copying data stored in said first cache memory area of one of said at least two resource management modules to said second cache memory area of the other of said at least two resource management modules.

8. A file control device as defined in claim 6 wherein each of said at least two resource management modules further includes fault detecting means for detecting a fault generated in the other of said at least two resource management modules, and area changing means for changing said second memory area into said first memory area in one of said at least two resource management modules when said fault is detected in the other of said at least two resource management modules by said fault detecting means in said one of said at least two resource management modules.

9. A file control device as defined in claim 6 wherein said resource management modules further include load monitoring means for monitoring loads on said corresponding resource management modules, load comparing means for comparing said loads between said resource management modules based on monitoring results of said load monitoring means and for determining said data of a selected memory device in one of said at least two resource management modules to be transferred to the other of said at least two resource management modules in accordance with a predetermined management transfer rule, when said loads on resource management modules are distributed unevenly, and restructuring means for changing said first area of said resource management module in which said transferred data of said selected device had been stored, into said second area, and for changing said second area of said resource management module receiving said transferred data into said first area.

10. A file control device as claimed in claim 1, further comprising a cache memory provided in each of said at least two resource management modules for storing the data recorded in the memory devices and data to be stored in the memory devices, and cache memory acquiring means for determining a cache memory area within each cache memory to be managed by each of said at least two resource management modules and for discriminating a first cache memory area for registering data recorded in the memory devices controlled by one of said at least two resource management modules and a second cache memory area for registering data recorded in the memory devices controlled by the other of said at least two resource management modules in said cache memory of each said resource management modules.

11. A file control device as defined in claim 10 wherein said cache memory acquiring means also copies data stored in said first cache memory area of one of said at least two resource management modules to said second cache memory area of the other of said at least two resource management modules.

12. A file control device as defined in claim 10 wherein said cache memory acquiring means in one of said at least two resource management modules further detects a fault generated in the other of said at least two resource management modules, and changes said second cache memory area into said first cache memory area in said one of said at least two resource management modules when said fault is detected in the other of said at least two resource management modules by said cache memory acquiring means in said one of said at least two resource management modules.

13. A file control device as defined in claim 10 wherein said cache memory acquiring means also monitors loads on said corresponding resource management modules, compares said loads between said resource management modules based on monitoring results and determines said data of a selected memory device in one of said at least two resource management modules to be transferred to the other of said at least two resource management modules in accordance with a predetermined management transfer rule, when said loads on resource management modules are distributed unevenly, and changes said first area of said resource management module in which said transferred data of said selected device had been stored, into said second area and changes said second area of said resource management module receiving said transferred data into said first area.

\* \* \* \* \*